United States Patent
Karampatsis et al.

(10) Patent No.: US 12,402,070 B2
(45) Date of Patent: Aug. 26, 2025

(54) SELECTING AN APPLICATION INSTANCE

(71) Applicant: Lenovo (Singapore) Pte. Ltd., New Tech Park (SG)

(72) Inventors: Dimitrios Karampatsis, Ruislip (GB); Apostolis Salkintzis, Athens (GR)

(73) Assignee: Lenovo (Singapore) Pte. Ltd., Singapore (SG)

( * ) Notice: Subject to any disclaimer, the term of this patent is extended or adjusted under 35 U.S.C. 154(b) by 424 days.

(21) Appl. No.: 17/998,889

(22) PCT Filed: May 15, 2020

(86) PCT No.: PCT/EP2020/063721
§ 371 (c)(1),
(2) Date: Nov. 15, 2022

(87) PCT Pub. No.: WO2021/228411
PCT Pub. Date: Nov. 18, 2021

(65) Prior Publication Data
US 2023/0217360 A1 Jul. 6, 2023

(51) Int. Cl.
*H04W 4/02* (2018.01)
*H04W 8/22* (2009.01)
(Continued)

(52) U.S. Cl.
CPC ............ *H04W 48/17* (2013.01); *H04W 4/02* (2013.01); *H04W 8/22* (2013.01); *H04W 24/10* (2013.01);
(Continued)

(58) Field of Classification Search
CPC ..... H04W 4/02–029; H04W 8/005–30; H04W 16/02–12; H04W 24/02–10;
(Continued)

(56) References Cited

U.S. PATENT DOCUMENTS

2021/0314906 A1* 10/2021 Matolia ................. H04W 24/10

FOREIGN PATENT DOCUMENTS

| WO | 2020018012 A1 | 1/2020 |
| WO | 2020239195 A1 | 12/2020 |

OTHER PUBLICATIONS

Samsung et al., "Update Solution 11 for Generalized Data Analytics-Based UPF Selection", Sa WG2 Meeting #129 S2-1811586, Oct. 15-19, 2018, pp. 1-6 (Year: 2018).*
(Continued)

*Primary Examiner* — Timothy J Weidner
(74) *Attorney, Agent, or Firm* — Kunzler Bean & Adamson

(57) ABSTRACT

Apparatuses, methods, and systems are disclosed for selecting a server application instance. One apparatus includes a network interface that communicates with a plurality of network functions in a mobile communication network and a processor that receives a request from a first network function to provide performance analytics for a first application. Here, the request includes a present location and a requested time. Additionally, the first application comprises a group of application instances. The processor generates performance analytics for the first application by using a first collection of performance data and reports the performance analytics to the first network function. Here, the performance analytics indicate a best application instance in the group of application instances for the present location and the requested time.

17 Claims, 12 Drawing Sheets

(51) Int. Cl.
*H04W 24/10* (2009.01)
*H04W 48/00* (2009.01)
*H04W 64/00* (2009.01)
*H04W 84/12* (2009.01)
*H04W 88/02* (2009.01)
*H04W 88/14* (2009.01)
*H04W 88/18* (2009.01)
*H04W 92/02* (2009.01)
*H04W 92/24* (2009.01)

(52) U.S. Cl.
CPC .......... *H04W 64/003* (2013.01); *H04W 84/12* (2013.01); *H04W 88/02* (2013.01); *H04W 88/14* (2013.01); *H04W 88/18* (2013.01); *H04W 92/02* (2013.01); *H04W 92/24* (2013.01)

(58) Field of Classification Search
CPC ........... H04W 28/02–26; H04W 36/0005–385; H04W 40/005–38; H04W 48/02–20; H04W 60/005–06; H04W 64/003–006; H04W 76/10–50; H04W 84/005–22; H04W 88/005–188; H04W 92/02–24
See application file for complete search history.

(56) References Cited

OTHER PUBLICATIONS

3GPP, "3rd Generation Partnership Project; Technical Specification Group Services and System Aspects; Study on enhancement of support for Edge Computing in 5G Core network (5GC) (Release 17)", 3GPP TR 23.748 V0.3.0, Jan. 2020, pp. 1-40.

PCT/EP2020/063721, "Notification of Transmittal of the International Search Report and the Written Opinion of the International Searching Authority, or the Declaration", International Searching Authority, Feb. 9, 2021, pp. 1-15.

Samsung et al., "Update Solution 11 for Generalized Data Analytics-Based UPF Selection", SA WG2 Meeting #129 S2-1811586, Oct. 15-19, 2018; pp. 1-6.

Samsung et al., "A new use case and key issue for edge computing support", SA WG2 Meeting #136AH S2-2001306, Jan. 13-17, 2020, pp. 1-2.

3GPP, "3rd Generation Partnership Project; Technical Specification Group Services and System Aspects; Study on application architecture for enabling Edge Applications; (Release 17)", 3GPP TR 23.758 V17.0.0, Dec. 2019, pp. 1-113.

3GPP, "3rd Generation Partnership Project; Technical Specification Group Services and System Aspects; Service Enabler Architecture Layer for Verticals (SEAL); Functional architecture and information flows; (Release 16)", 3GPP TS 23.434 V16.3.0, Mar. 2020, pp. 1-120.

* cited by examiner

| Connection | Application | UE Location | Server Instance | Start | End | Protocol | Avg. Packet Delay | Avg. Loss Rate |
|---|---|---|---|---|---|---|---|---|
| #1 | App 1 | Cell ID x | Server Address #1 | 03/17/2020 15:32 | 03/17/2020 16:02 | TCP | 112 ms | 5*10^-6 |
| #2 | App 2 | Cell ID y | Server Address #2 | 03/18/2020 10:04 | 03/18/2020 10:45 | TCP | 123 ms | 5*10^-6 |
| ⋮ | ⋮ | ⋮ | ⋮ | | | | ⋮ | ⋮ |
| #N | App N | Cell ID n | | | | | | |

SELECTING AN APPLICATION INSTANCE

The subject matter disclosed herein relates generally to wireless communications and more particularly relates to using UE location and performance data analytics to select an optimal server instance.

BACKGROUND

The following abbreviations and acronyms are herewith defined, at least some of which are referred to within the following description.

Third Generation Partnership Project ("3GPP"), Fifth-Generation Core ("5GC"), Access and Mobility Management Function ("AMF"), Address Resolution Function ("ARF"), Application Programing Interface ("API"), Application Performance Measurement Function ("APMF"), Domain Name System ("DNS"), Downlink ("DL"), Edge Data Network ("EDN"), Evolved Node-B ("eNB"), Evolved Packet Core ("EPC"), Internet Protocol ("IP"), Long Term Evolution ("LTE"), LTE Advanced ("LTE-A"), Modulation Coding Scheme ("MCS"), Mobility Management Entity ("MME"), Network Function ("NF"), Network Exposure Function ("NEF"), Network Repository Function ("NRF"), Network Slice Selection Assistance Information ("NSSAI"), Network Data Analytics Function ("NWDAF"), Next Generation (e.g., 5G) Node-B ("gNB"), Next Generation Radio Access Network ("NG-RAN" or "5G-RAN"), New Radio ("NR"), Policy and Charging Control ("PCC"), Policy Control Function ("PCF"), Packet Data Network ("PDN"), Packet Data Unit ("PDU"), PDN Gateway ("PGW"), Public Land Mobile Network ("PLMN"), Radio Access Network ("RAN"), Radio Access Technology ("RAT"), Server Application Discovery Management Function ("SDMF"), Serving Gateway ("SGW"), Session Management Function ("SMF"), Single Network Slice Selection Assistance Information ("S-NSSAI"), Transmission Control Protocol ("TCP"), Unified Data Management ("UDM"), User Entity/Equipment (Mobile Terminal) ("UE"), User Plane Function ("UPF"), Uplink ("UL"), Universal Mobile Telecommunications System ("UMTS"), and Worldwide Interoperability for Microwave Access ("WiMAX").

In certain embodiments, communication systems, an edge data network may be deployed to enhance performance. When a UE is located in an edge data network service area, it receives the address of an appropriate edge-instance Server Application. Otherwise, (i.e., when the UE roams outside the edge data network service area) it receives the address of a default (e.g. cloud-based) instance of the Server Application.

BRIEF SUMMARY

Methods for selecting a server application instance are disclosed. Apparatuses and systems also perform the functions of the methods.

One method of a NWDAF, e.g., for selecting a server application instance, includes receiving a request from a first network function (e.g., SDMF) to provide performance analytics for a first application. Here, the request includes a present location and a requested time. Additionally, the first application comprises a group of application instances. The method includes generating performance analytics for the first application by using a first collection of performance data. Here, the performance analytics indicate a best application instance in the group of application instances for the present location and the requested time. The method includes reporting the performance analytics to the first network function.

One method of a SDMF, e.g., for selecting a server application instance, includes receiving a first request from a remote unit to discover a server application instance for a first application. Here, the remote unit corresponds to a first location. The method includes determining that the first request is serviceable by multiple server application instances at the first location. The method includes identifying an analytics function (e.g., NWDAF) that provides performance data analytics for the first application. The method includes sending a second request to the analytics function to retrieve performance data analytics for the first application at the first location and for a requested time. The method includes selecting an optimal server application instance based on the performance data analytics. The method includes sending a response to the first request, the response including the selected server application instance.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3 is a diagram illustrating one embodiment of a collection of performance data;

DETAILED DESCRIPTION

Figure 1:
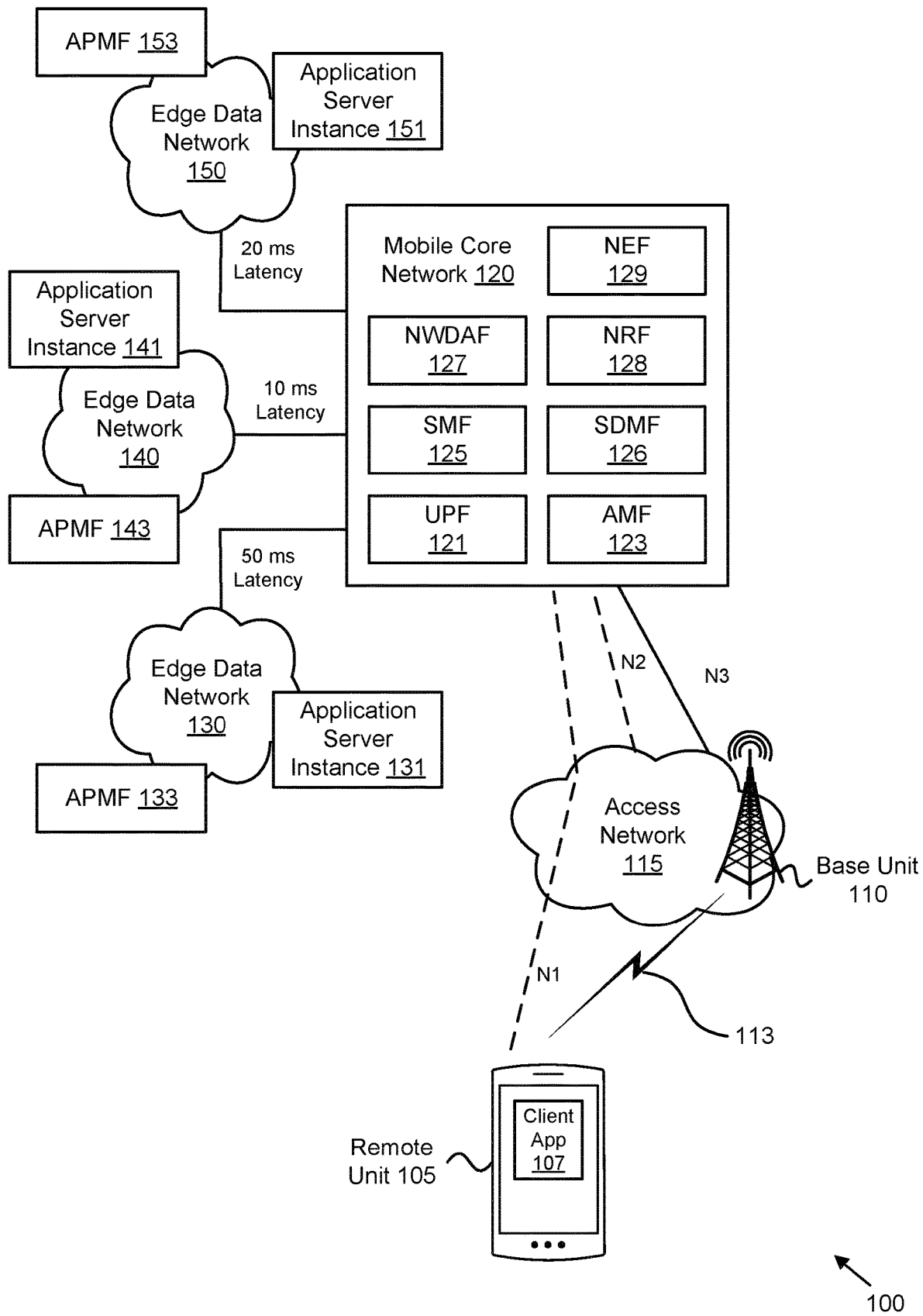
FIG. 1 is a block diagram illustrating one embodiment of a wireless communication system for selecting a server application instance.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for selecting a server application instance. A UE communicates with a mobile network (e.g., 5G network) that supports edge computing services. The edge computing services are offered by one or more Edge Data Networks ("EDNs"), which are connected to the mobile network. Each EDN provides edge computing services in a geographical area composed of one or multiple cells and is referred to as the EDN Service Area.

When a client application in the UE wants to communicate with a server application, it attempts to discover a server application in the network to communicate with. In many deployment scenarios, the server application is deployed in multiple different locations in the network, e.g., in multiple application servers located in different Edge Data Networks ("EDNs"). In such scenarios, the different server applications deployed in the network are referred to as server application instances. Deploying multiple server application instances enables better traffic distribution, better resilience, and better communication performance, because a server application instance can be selected that provides minimum transmission delay.

In scenarios where there are multiple server application instances available, the network selects the "best" server application instance for communicating with a client application in a UE. Note that which server application instance is the "best" one for the UE depends on the present location of the UE. In some embodiments, the "best" server application instance is the one deployed closest to the UE's location. However, this is not always the case that the "best" server application instance is the server application instance closest to the UE, e.g., because this instance may be using limited computing and/or networking resources, or may usually serve a large number of UEs, whereas other server application instances may use larger computing and/or networking resources and may not usually serve many UEs.

The present disclosure specifies a novel solution for selecting the "best" server application instance for a UE by considering performance analytics, which determine the expected performance between the client application in the UE and each server application instance in the network.

FIG. 1 depicts a wireless communication system 100 for selecting a server application instance, according to embodiments of the disclosure. In one embodiment, the wireless communication system 100 includes at least one remote unit 105, at least one base unit 110 in an access network ("AN") 115, a mobile core network 120, a first EDN 130 at a first location, a second EDN 140 at a second location, and a third EDN 150 at a third location. The AN 115 and the mobile core network 120 form a mobile communication network. The AN 115 may be composed of at least one base unit 110.

The remote unit 105 may communicate with the access network 115 using 3GPP communication links and/or non-3GPP communication links, according to a radio access technology deployed by the AN 115. Even though a specific number of remote units, base units, ANs, mobile core networks, and edge data networks are depicted in FIG. 1, one of skill in the art will recognize that any number of remote units, base units, ANs, edge data networks, and mobile core networks may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the access network 115 via uplink ("UL") and downlink ("DL") communication signals. Furthermore, the UL and DL communication signals may be carried over the communication links 113. Note, that the access network 115 is an intermediate network that provide the remote units 105 with access to the mobile core network 120.

In some embodiments, the remote units 105 communicate with an Application Server Instance (i.e., 131, 141 or 151) via a network connection with the mobile core network 120. For example, an application in a remote unit 105 (e.g., web browser, media client, telephone/VoIP application) may trigger the remote unit 105 to establish a PDU session (or other data connection) with the mobile core network 120 using the access network 115. The mobile core network 120 then relays traffic between the remote unit 105 and the Application Server Instance (e.g., in EDN 130, 140 or 150) using the PDU session. Note that the remote unit 105 may establish one or more PDU sessions (or other data connections) with the mobile core network 120. The remote unit 105 may establish additional PDU sessions for communicating with other data network and/or other communication peers. As discussed in further detail below, the mobile data connection (PDU session) of a remote unit 105 may be modified to include an edge Application Server Instance (i.e., 131, 141 or 151) if the remote unit 105 is located in an EDN service area.

The base units 110 may be distributed over a geographic region. In certain embodiments, a base unit 110 may also be referred to as an access terminal, an access point, a base, a base station, a Node-B, an eNB, a gNB, a Home Node-B, a relay node, a device, or by any other terminology used in the art. The base units 110 are generally part of a radio access network ("RAN"), such as the access network 115, that may include one or more controllers communicably coupled to one or more corresponding base units 110. These and other elements of radio access network are not illustrated but are well known generally by those having ordinary skill in the art. The base units 110 connect to the mobile core network 120 via the access network 115.

The base units 110 may serve a number of remote units 105 within a serving area, for example, a cell or a cell sector, via a communication link 113. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the communication links 113. The communication links 113 may be any suitable carrier in licensed or unlicensed radio spectrum. The communication links 113 facilitate communication between one or more of the remote units 105 and/or one or more of the base units 110.

In one embodiment, the mobile core network 120 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 120. In certain embodiments, each mobile core network 120 belongs to a single public land mobile network ("PLMN"). However, the present disclosure is not intended to be limited to the implementation of any particular wireless communication system architecture or protocol.

The mobile core network 120 includes several network functions ("NFs"). As depicted, the mobile core network 120 includes at least one UPF user plane function ("UPF") 121 that serves the access network 115. Note that in certain embodiments, the mobile core network may contain one or more intermediate UPFs, for example an additional UPF that serves one or more of the edge data networks 130, 140, 150. In such embodiments, the UPF 121 would be a central UPF, as discussed in further detail below.

The mobile core network 120 also includes multiple control plane functions including, but not limited to, an Access and Mobility Management Function ("AMF") 123, a Session Management Function ("SMF") 125, a Network Data Analytics Function ("NWDAF") 127, a Network Repository Function ("NRF") 128 (used by the various NFs to discover and communicate with each other over APIs), and a Network Exposure Function 129. In certain embodiments, the mobile core network 120 may also include a Unified Data Management function ("UDM"), an Authentication Server Function ("AUSF"), a Policy Control Function ("PCF"), or other NFs defined for the 5GC. In certain embodiments, the mobile core network 120 may include a AAA server.

In various embodiments, the mobile core network 120 supports different types of mobile data connections and different types of network slices, wherein each mobile data connection utilizes a specific network slice. Here, a "network slice" refers to a portion of the mobile core network 120 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF 125 and UPF 121. In some embodiments, the different network slices may share some common network functions, such as the AMF 123. The different network slices are not shown in FIG. 1 for ease of illustration, but their support is assumed.

The NWDAF 127 derives analytics based on an NF request (Consumer NF). A Consumer NF may ask analytics either in form of statistics or predictions. The NWDAF 127 derives the analytics by collecting relevant data from other NFs. For example, the NWDAF 127 derives statistics or predictions for a location of the remote unit 105 by collecting location changes events from the AMF 123. In various embodiments, the NWDAF 127 retrieves the related data from the NFs by using the Event Exposure Subscribe/Notify service operation to collect specific data. For example, the NWDAF 127 may subscribe from a NF/AF (e.g., AMF 123) to retrieve specific data by including an Event ID (e.g., Location Changes). The NF/AFs then Notifies the NWDAF when the "Event" took place. In the above example, an AMF notifies the NWDAF 127 when the UE location changes.

As mentioned above, the NWDAF 127 needs to collect performance data for one or more applications. The present disclosure introduces a new network function, called Application Performance Measurement Function ("APMF"), for obtaining network performance data. In the depicted embodiment, each of the EDN 130, 140 and 150 include an APMF (i.e., APMFs 133, 143, and 153). An APMF is located in an EDN and can measure the performance of one or more applications deployed in this EDN. For obtaining the performance of a certain application, the APMF obtains the performance of all (or selected) communication sessions between a client app instance of this application and a server app instance of this application, where the server app instance is located in same EDN as the EDN of the APMF. The NWDAF 127 collects performance data for this application from multiple APMFs in each EDN supporting this application. After obtaining the performance data for a communication session, the APMF reports the data to NWDAF 127. Because the NWDAF 127 collects measurements from many APMFs, each one located in a different EDN, the NWDAF 127 can analyze these measurements and estimate which server application instance is expected to provide the best performance when a new client application instance requests to connect with a server application instance.

The present disclosure introduces a new 5G network function, called a Server application Discovery Management Function ("SDMF") 126 which selects the best server app instance based on analytics provided by the NWDAF. In various embodiments, the SDMF 126 determines the location of the remote unit 105, determines the client application instance requesting to connect to a server application instance, retrieves network performance analytics relating to the location, and determines a best Application Server Instance (i.e., 131, 141 or 151).

FIG. 1 shows three server application instances (i.e., Application Server Instances 131, 141, and 151) deployed in three different EDNs (i.e., Edge Data Networks 130, 140, and 150, respectively). In the example shown in FIG. 1, the SDMF 126 considers selecting the server application instance 131 of the EDN network 130 because this is the closest to the remote unit 105. However, this server 131 may provide an average latency (50 ms) that is larger to average latency of server application instance 141 located at the EDN 140 of Location 2 (10 ms), which is not the closest to the remote unit 105's present location. In such embodiments, the SDMF 126 selects the application server instance with the best performance and sends the IP address of the selected server instance to the remote unit 105.

While FIG. 1 depicts components of a 5G RAN and a 5G core network, the described embodiments for selecting a server application instance apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 123 may be mapped to an MME, the SMF 125 may be mapped to a control plane portion of a PGW and/or to an MME, the UPF 121 may be mapped to an SGW and a user plane portion of the PGW, the UDM/UDR may be mapped to an HSS, etc.

Although specific numbers and types of network functions are depicted in FIG. 1, one of skill in the art will recognize that any number and type of network functions may be included in the mobile core network 120. Moreover, where the mobile core network 120 is deployed as an EPC, the depicted network functions may be replaced with appropriate EPC entities, such as an MME, S-GW, P-GW, HSS, and the like.

Figure 2:
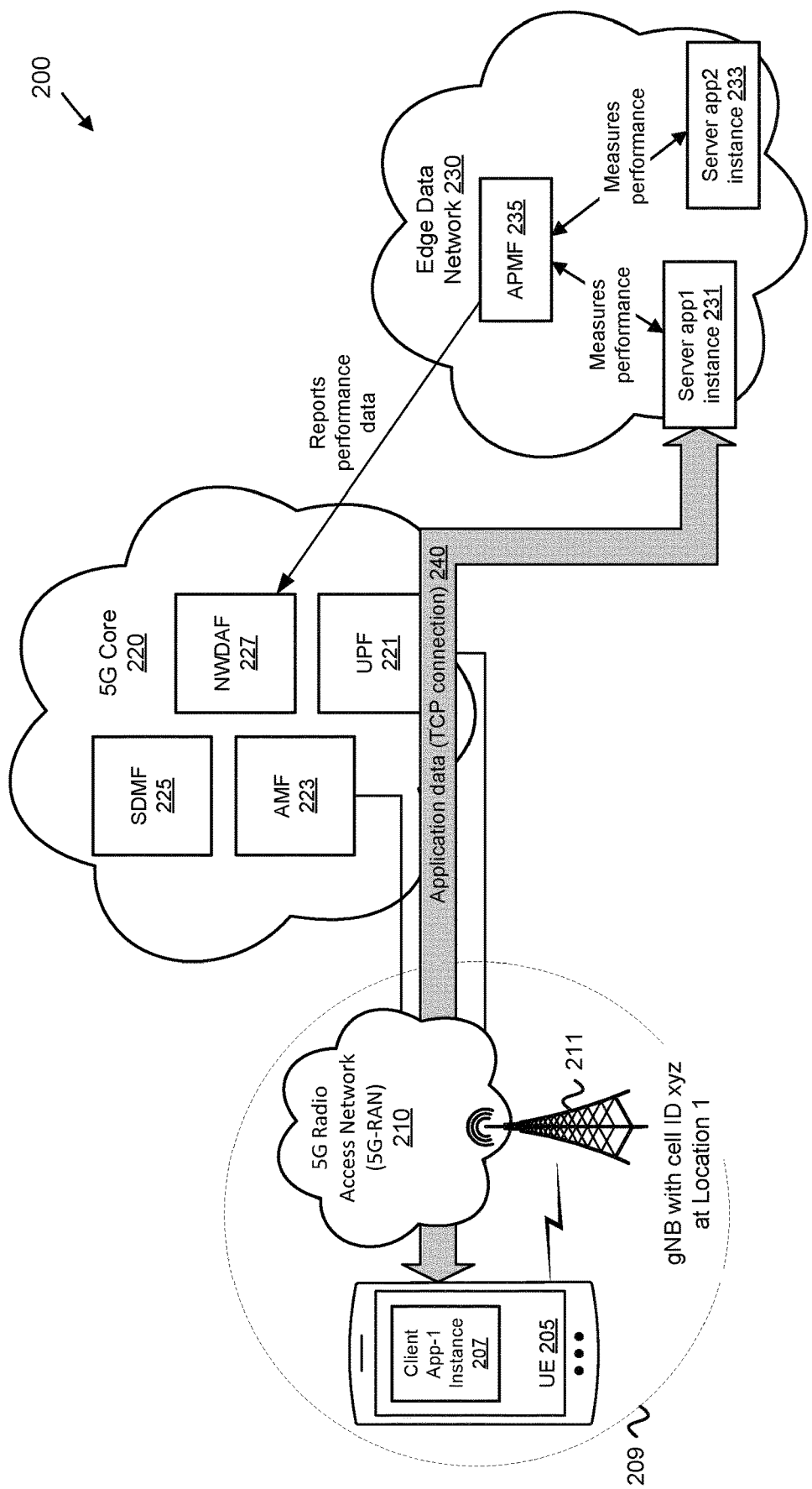
FIG. 2 is a network diagram illustrating one embodiment of a network deployment for selecting a server application instance.

FIG. 2 depicts a network deployment 200 comprising a UE 205, a 5G Radio Access Network (5G-RAN) 210, a 5G core network 220 and an edge data networks ("EDN") 230. The UE 205 is one embodiment of the remote unit 105 and runs an instance of a first client application ("Client app-1 instance") 207. Note that for certain Server Applications, a local instance of the Server Application may be located in the EDN 230 (e.g., Server app-1 instance 231 and Server app-2 instance 233). The 5G core network 220 includes a UPF 221, an AMF 223, a SDMF 225 and a NWDAF 227. Via the 5G core 220, the UE 205 establishes an application session (e.g., TCP connection) 240 with a local instance of a server application (here server app-1 instance 321).

As aforementioned, the present disclosure specifies a novel solution for selecting the "best" server app instance for a UE 205 at the current location of the UE 205, by considering performance analytics, which determine the expected performance between a given client app 207 in the UE 205 and each server app instance 231, 233 in the network based on the present location 209 of the UE 205. There may be multiple client app instances, each one in a different UE 205 and there could be multiple server app instances, each one in a different network location (e.g., in a different EDN). The performance analytics are derived by the NWDAF 227 in the 5G core network 220.

Note that the "best" server app instance selected with this solution is the best server app instance from a statistical point of view. This means that the solution can optimize the average communication performance when a large number of UEs establish communication sessions with multiple server app instances in the network. In this case, the solution can optimize the average communication performance across all these communication sessions. However, the solution does not guarantee that the best server app instance will be selected for every single UE 205 (or, for every client app instance 207) because it is based on historical data and it filters out short-time changes in the network, e.g., short congestion conditions, short transmission failures, etc.

For deriving performance analytics for an application, the NWDAF 227 needs to collect performance data for this application. This means that every time a client app instance 207 of this application establishes a communication session 240 with a server app instance 231 of this application, performance data is to be collected (such as latency and packet loss rate) that characterizes the performance of this communication session.

As depicted, the NWDAF 227 obtains performance data from the APMF 235 located in the EDN 230. The APMF 235 measures performance data for all (or selected) communication sessions established with the server application instances 231, 233 deployed in this EDN 230. The illustrated server app-1 instance 231 and server app-2 instance 233 correspond to server application instances of two different applications. The APMF 235 obtains the performance of the communication session 240 between a client app instance 207 of this application and a server app instance 231 of this application, where the server app instance 231 is located in same EDN 230 as the APMF 235. The NWDAF 227 collects performance data for this application from multiple APMFs in each EDN supporting this application.

After the communication session 240 is terminated, the APMF obtains the performance data (e.g., the average packet loss rate and the average latency) of this session, it determines the UE location (e.g., gNB with cell ID 'xyz' at Location 1) and sends to NWDAF 227 a measurement report containing: A) the application identity associated with the communication session; B) the UE location; C) an identifier of the server app instance (e.g., its IP address); D) start and end times of the session; and E) the measured performance data for the session (e.g., average packet delay, average loss rate, etc.).

The NWDAF 227 collects all the received measurement reports from one or more APMFs and builds a big table of performance data. FIG. 3 depicts one example of a performance data table. Because the NWDAF 227 collects measurements from many APMFs, each one located in a different EDN, the NWDAF 227 can analyze these measurements and estimate which server app instance is expected to provide the best performance when a new client app instance requests to connect with a server app instance. The SDMF 225 selects the best server app instance based on analytics provided by the NWDAF 227, as discussed if further detail below.

FIG. 3 depicts an exemplary table 300 of server application performance data collected from multiple server application instances. As depicted, the table 300 may contain data for different applications, different UE locations, different server instances, different times-of-day, different session protocols, etc. An NWDAF 227 may store and maintain the table 300 in order to determine a best/optimal server instance when a UE 205 requests a data session involving a particular application. Here, the UE location and time-of-day may be used by the NWDAF 227 to identify the best/optimal server instance.

Figure 4:
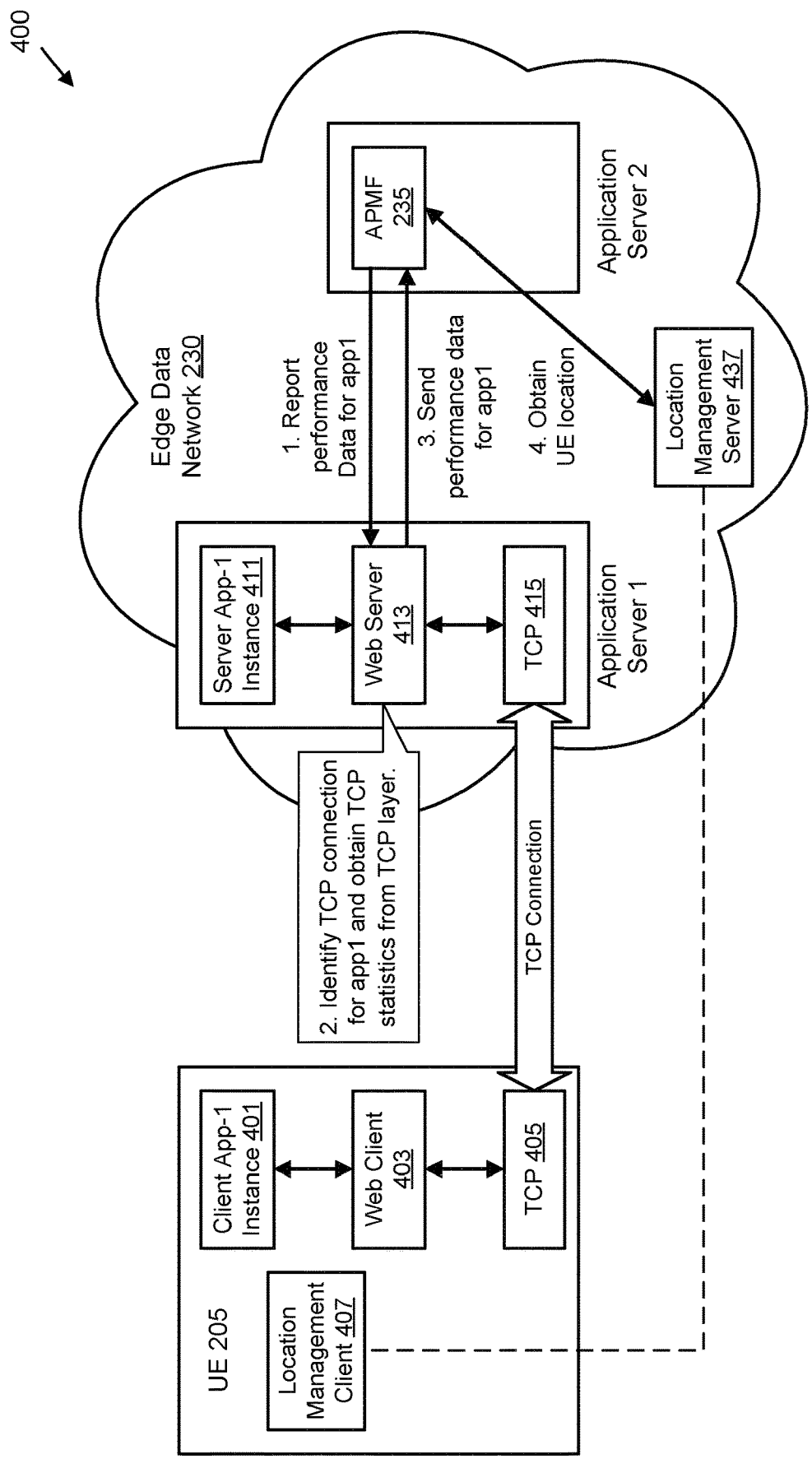
FIG. 4 is a diagram illustrating one embodiment of collecting performance data.

FIG. 4 depicts a scenario 400 of the APMF obtaining performance data for the application "App-1", according to embodiments of the disclosure. Here, a client App-1 instance 401 establishes an application session with a server App-1 instance 411. In the depicted scenario, the App-1 is a web application (i.e., is based on the HTTP protocol), where the web client 403 accesses the web server 413. The web server 413 that hosts the server App-1 instance 411 is configured by the APMF 235 to report measurements for all (or selected) communication sessions of App-1 (see step 1). The web server 413 then identifies a communication session (e.g., TCP connection) established for the server App-1 instance 411, obtains the performance data for this session, e.g., by requesting TCP statistics from the TCP layer (see step 2), and finally reports this data to the APMF 235 when the communication session is completed (see step 3). In some embodiments, the web server 413 may be configured, e.g., in step 1, to report measurements only for selected communication sessions of App-1, e.g., only for long-lived communication sessions, say, with minimum duration of one (1) minute. This way, the frequency of measurement reports is reduced and the obtained performance data is more accurate because it is averaged over a longer time window.

After the APMF 235 obtains the performance data (i.e., measurements) for a communication session of the App-1, the APMF 235 determines the location of the UE 205 associated with this communication session, e.g., by interacting with a Location Management server 437 located in the EDN 230 (see step 4). Note that the UE 205 may have a corresponding location management client 407 for reporting a UE location. After determining the UE location, the APMF 235 may send to the NWDAF 227 (not shown in FIG. 4) a performance data report for this communication session of App-1, assuming the NWDAF 227 has subscribed with the APMF 235 to receive such reports for App-1.

Figure 5:
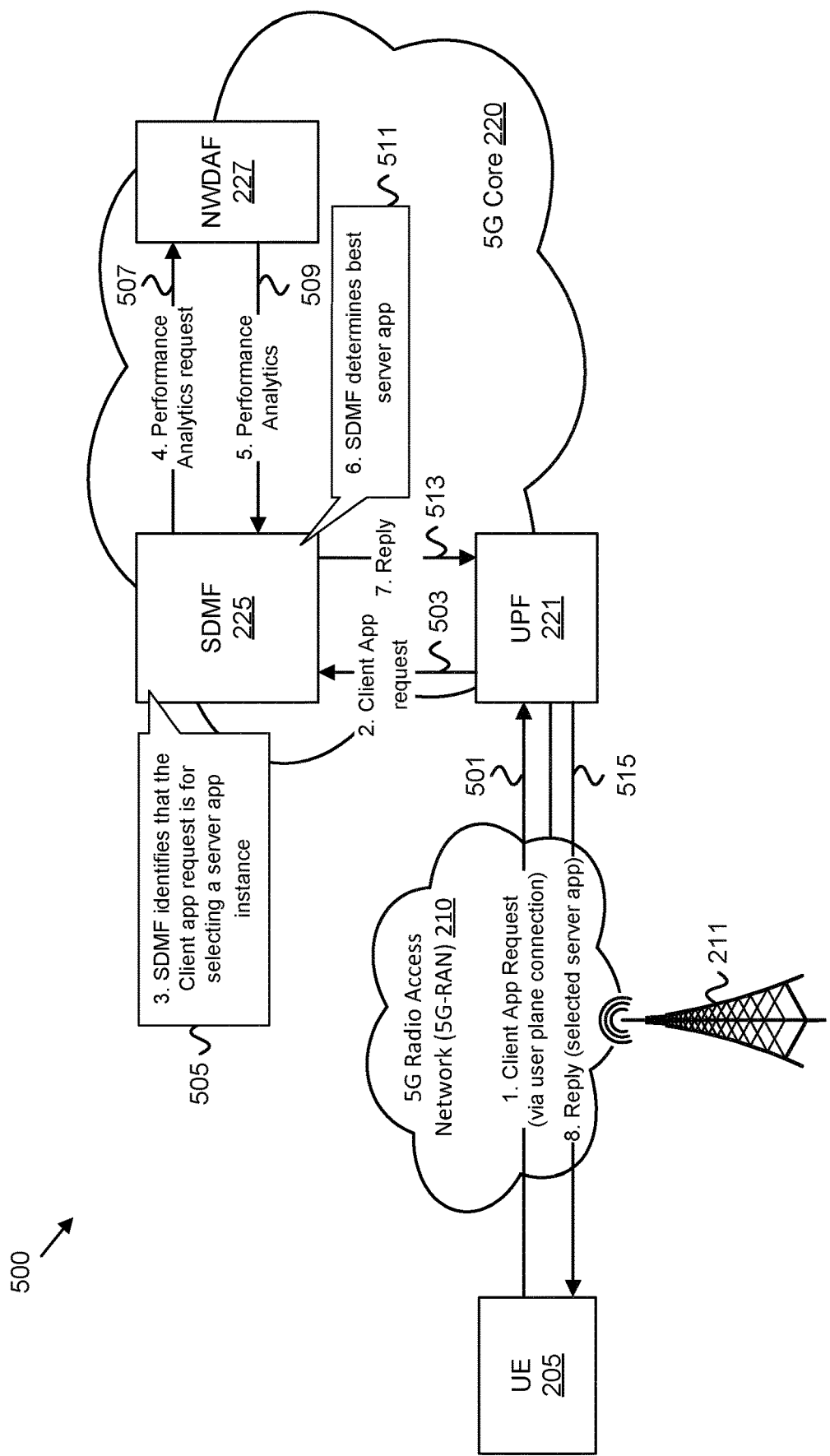
FIG. 5 is a diagram illustrating one embodiment of identifying an optimal server instance.

FIG. 5 depicts a scenario 500 for the SDMF 225 selecting the best server application instance based on performance analytics from the NWDAF 227, according to embodiments of the disclosure. The SDMF 225 identifies when a UE 205 requests to communicate with a server application of a given application (see block 505), it retrieves performance analytics from the NWDAF by providing the UE location and the identity of the given application (see messaging 507-509), and selects the "best" server app instance for this UE 205 by using the performance analytics returned by NWDAF (see block 511). For example, when a UE 205 located in cell-X has a client app that sends a DNS query (client app request) to find an IP address for app1.example.com (routed to SDMF 225 via UPF 221, see messaging 501 and 503), the SDMF 225 requests from the NWDAF 227 to provide performance analytics for application=app1.example.com and location=cell-X (see messaging 507).

As discussed above, the NWDAF 227 collects the performance data provided by APMFs in different EDNs, and can utilize this data to know the communication performance experienced by many UEs, in many different locations and at many different times, which communicated with many server app instances in different EDNs. This knowledge may be exploited to predict the communication performance that will be experienced by a UE in a certain location and at a certain time instance, when this UE starts communication with a certain server app instance. For example, by analyzing the collected measurement reports, the NWDAF 227 may predict that, for a UE in cell-X and at 05:23 μm, the expected performance will be: [{Loss data rate=5×10-3, Latency=35.7 ms}, if the UE communicates with server app instance 1; {Loss data rate=6×10-4, Latency=10.5 ms}, if the UE communicates with server app instance 2; . . . ; {Loss data rate=7×10-4, Latency=53.2 ms}, if the UE communicates with server app instance N]

The above predicted data, also referred to as "performance analytics," can be used for determining the "best" (i.e., optimal) server app instance for a UE (client app request) at a specific location that requests to communicate with a server app at a specific time instance.

The NWDAF responds to the SDMF with performance analytics (see messaging 509), which include the expected performance at the requested time of day between this UE 205 and each known server app instance of app1.example.com. Based on the performance analytics from NWDAF 227, the SDMF 225 determines the best server app instance (see block 511) and sends a DNS reply to UE including the IP address of the best server app instance (routed to UE 205 via UPF 221, see messaging 513 and 515).

In some embodiments, the NWDAF 227 may provide suggestions on which server app instance has the best expected performance at the UE location. In other embodiments, the NWDAF 227 may provide a list of one or more server app instances and the associated performance data, and the SDMF 225 may select the best server app instance based on the performance data.

The NWDAF 227 derives analytics for "best" server app instance for an application at the current UE location where the client app in the UE 205 requests to discover a server app instance. The UE location may be a cell identity, or geographical coordinates, or the identity of a non-3GPP access point serving the UE 205, etc.

When a client app in a UE 205 sends a request to discover a server app instance (in one embodiment this is a DNS request), an SDMF 225 in the 5G core network 220 determines the application initiating the client app request, and that the request can be served by a server app instance in an EDN. In one embodiment, the SDMF 225 is the SMF or an NF handling DNS requests.

The SDMF 225 determines the "best" server app instance by requesting analytics for server app instance performance at the UE location from the NWDAF 227. The NWDAF 227 in the response may provide a list of one or more server app instances with their respective statistical performance. In certain embodiments, the SDMF 225 selects a server app instance, the UPF 221 serving the UE 205 may be configured to route the client app request to the selected server app instance.

Figure 6A:
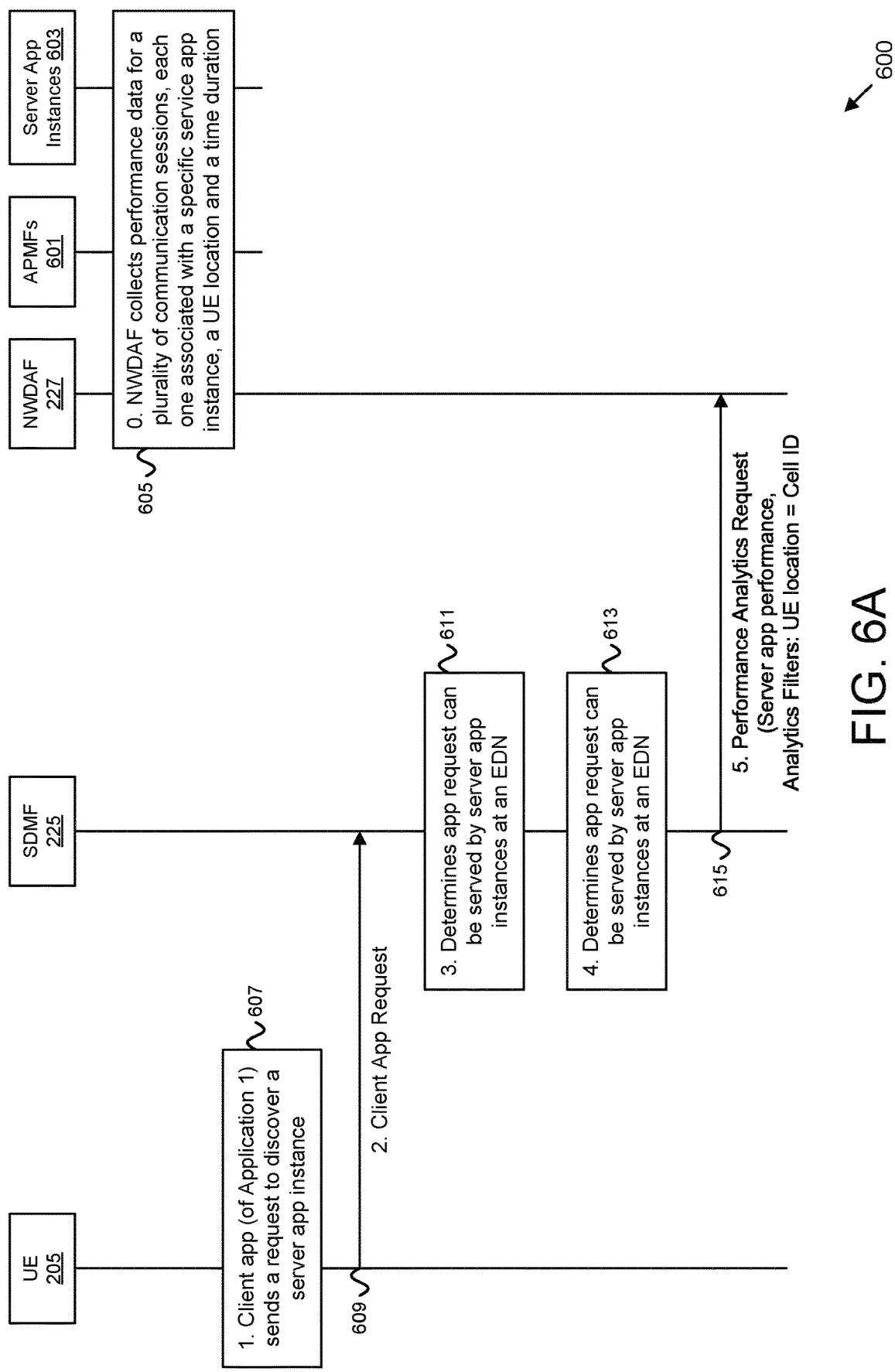
FIG. 6A is a signal flow diagram illustrating one embodiment of identifying an optimal server instance.
Figure 6B:
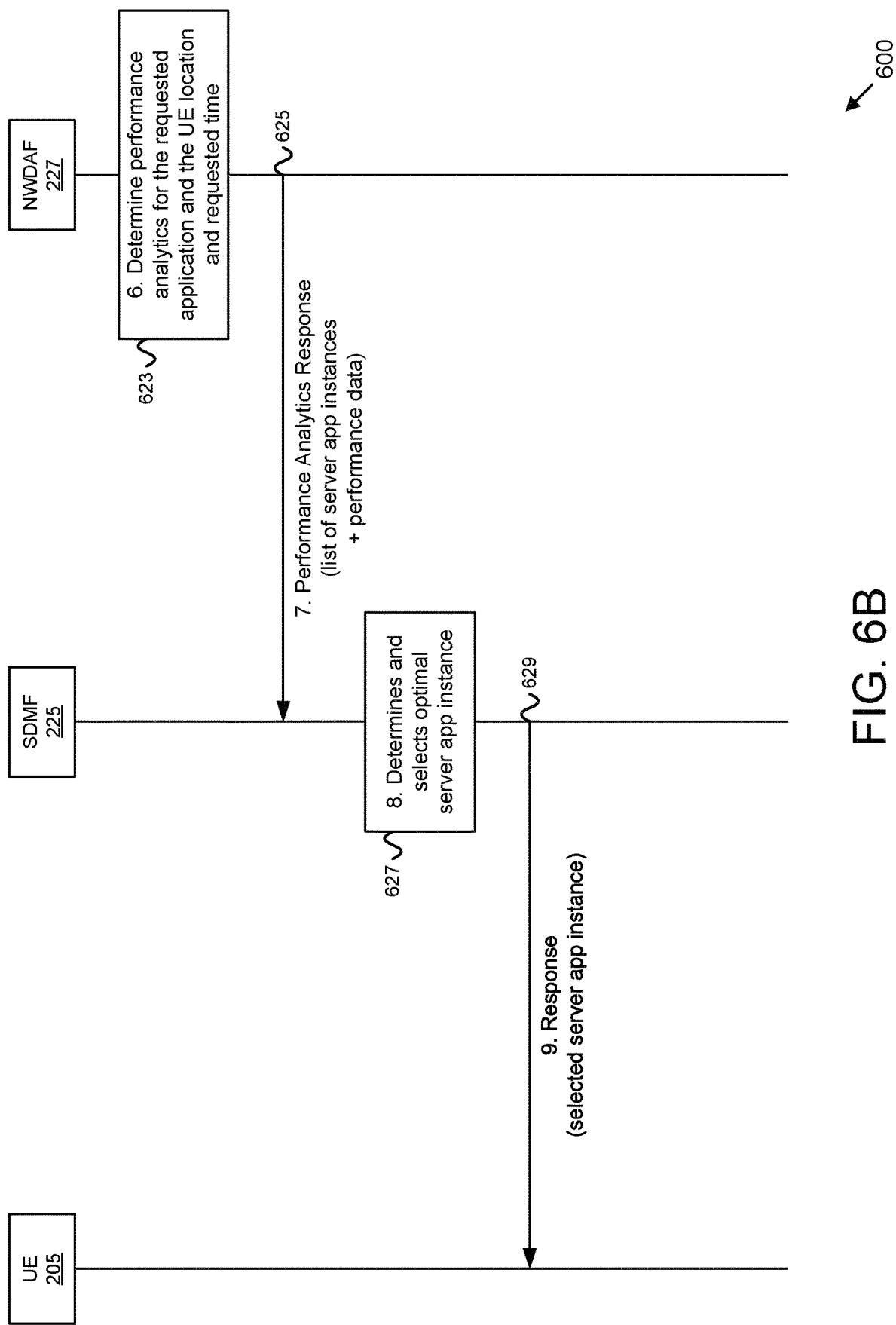
FIG. 6B is a continuation of the procedure depicted in FIG. 6A.

FIGS. 6A-6B depict a signaling flow for a procedure 600 for analytics-based server selection, according to embodiments of the disclosure. The procedure 600 involves the UE 205, the SDMF 225, the NWDAF 227, a plurality of APMFs 601 (each located in an EDN), and a plurality of server app instances 603 monitored by the APMFs 601. It is clarified again that, although the SDMF 225 is presented as a standalone function, it may be collocated with another mobile network function, e.g., with the SMF 125.

At Step 0, the NWDAF 227 collects performance data for a plurality of communication sessions, each one associated with an application, a server app instance for this application, a UE location, time duration (start/end times), etc. (see block 605). Collecting performance data is described in further detail below with reference to FIGS. 7A-7B.

At Step 1, a client application (i.e., of Application 1) in the UE 205 is triggered to discover an application server (see block 607). At Step 2, the client app in the UE 205 sends a request via a user plane connection to discover a server app instance (see messaging 609). In one embodiment the request is a DNS request.

Note that in the FIGS. 6A-6B, the UE 205 is assumed to be "Edge Unaware," i.e., there is no client in the UE 205 that determines whether the client app request should be send to a server app instance in the anchor application server (e.g., in the cloud) or to a server app instance in an EDN.

At Step 3, the client app request is received by an SDMF 225 in the 5G core. The SDMF 225 determines the application of the client app request (i.e., the Application 1 is identified from the request) (see block 611). In one embodiment, the application determination is carried out based on PCC rules provided by a PCF in the 5G core.

At Step 4, the SDMF 225 also determines that at the UE location, the client app request may be served by a server app instance hosted in an EDN (e.g., EDN 230) (see block 613). The service determination may also be carried out based on PCC rules provided by the PCF.

At Step 5, the SDMF 225 decides to send a request to the NWDAF 227 to receive analytics of performance of server app instances hosted at an EDN at the UE location (see messaging 615). The SDMF 225 may query the NRF 128 to determine the NWDAF 227 providing analytics at the UE location.

Accordingly, the SDMF 225 sends a request for Analytics to the NWDAF (see messaging 615). In one embodiment, the request includes an Analytic ID identifying the type of analytics required (i.e., server app performance) and the location of the UE where the performance data are requested. The request also includes a requested time, such as time-of-day, day-of-the-week, calendar date, etc.

Continuing on FIG. 6B, at Step 6 the NWDAF 227 derives performance analytics by using the collected performance data for a plurality of communication sessions for Application 1, and by considering the present UE location and requested time (see block 623)

At Step 7, the NWDAF 227 reports analytics containing a list of one or more server app instances and associated statistical performance data (see messaging 625). At Step 8, the SDMF 225 selects the Application Server instance that provided the best performance based on the statistical performance data (see block 627).

At Step 9, the SDMF 225 responds to the client app in the UE 205 including the selected server app instance (see messaging 629). The UE 205 then initiates communication with the selected server app instance. An alternative embodiment of step 9 is that the SDMF 225 configures the UPF (i.e., UPF 221) to route the client app request to the selected server app instance. In such a case the server app instance will respond directly to the UE 205.

Figure 7A:
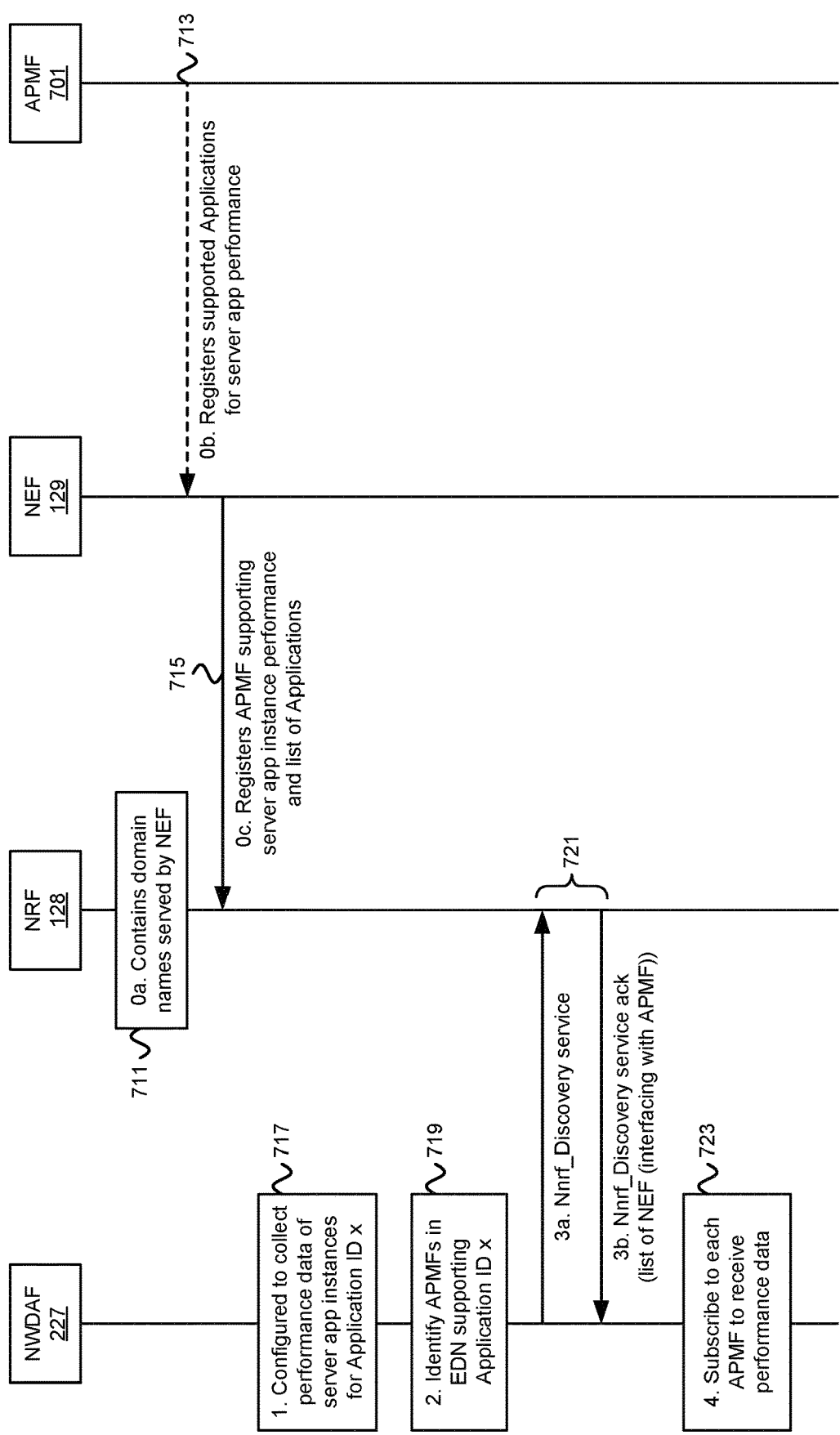
FIG. 7A is a signal flow diagram illustrating one embodiment of collecting performance data.
Figure 7B:
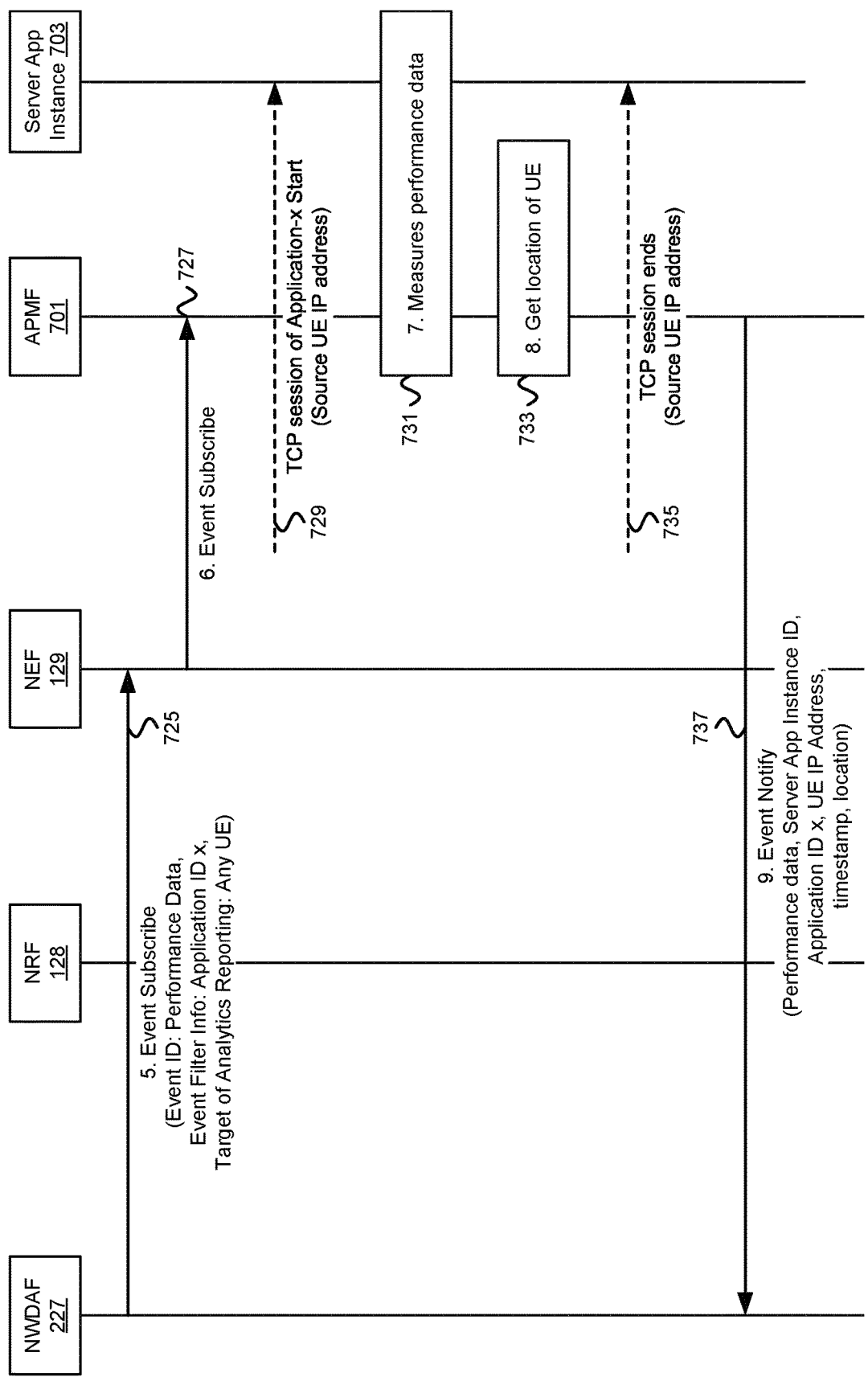
FIG. 7B is a continuation of the procedure depicted in FIG. 7A.

FIGS. 7A-7B depict a signaling flow for a procedure 700 for collecting performance data for a plurality of communication sessions, according to embodiments of the disclosure. The procedure 700 involves the NWDAF 227, the NRF 128, the NEF 129, an APMF 701, and a server app instance 703.

At step 0, the NRF 128 contains domain names served by each NEF 129. The APMF 701 configures-via the NEF 129-a list of applications supporting the reporting of performance data of server app instances.

At step 1, the NWDAF 227 is configured to collect performance data for an application. The NWDAF 227 may be configured to collect performance data for an application when, e.g., there is a Service Level Agreement requiring specific performance for this application or when the NWDAF 227 is required to provide performance analytics for this application.

At step 2, the NWDAF 227 identifies the APMF(s) 701 that supports this application. Alternatively, the NWDAF 227 may discover the NEF 129 that interfaces with the APMF(s) 701 that supports this application. The NWDAF 227 may retrieve this information from the NRF 128, or may be requested as part of an Analytic request from a NF consumer. At step 3, the NWDAF 227 may interface with the NRF 128 to obtain a list of NEFs that interface with one or more APMFs 701 supporting the application.

At step 4, the NWDAF 227 determines to subscribe with every APMF 701 that can provide performance data for the considered application. The NWDAF 227 may determine to subscribe for certain events relevant to the performance data.

Continuing on FIG. 7B, at step 5, the NWDAF 227 sends an event subscription request towards an APMF 701 (see messaging 725). If the request goes via the NEF 129, then the NEF 129 forwards the request to the appropriate APMF 701 in each EDN that the NEF 129 can interface to (the NEF 129 registers domain names supported at the NRF 128).

The subscription request contains an Event ID identifying the type of information to report (i.e., performance data), an identifier of the application, and additional parameters already specified in 3GPP specs, such as a target of event reporting (i.e., any UE) and Event Filter information (for example report performance data at a particular time of day).

At step 6, the NEF 129 forwards the subscription request to the APMF(s) 701 (see messaging 729). In the depicted embodiment, the server app instance 703 starts a TCP session with a UE for Application-x (see messaging 729). Here, the TCP session is associated with a source UE IP address.

At step 7, the APMF 701 measures performance data every time a client app instance establishes a communication session (such as a TCP connection) with the server app instance 703 associated with this APMF 701 (see block 731).

At step 8, the APMF 701 may get the UE location by sending a Location Report request to a Location Manager Server 437 (see block 733, an example Location Report request is described with reference to TS 23.434, clause 9.2.2). The Location Manager Server 437 than asks the Location Management Client 407 in the UE 205 to provide its location (refer to FIG. 4).

At step 9 of FIG. 7B, after the communication session is completed (see messaging 735) the APMF 701 may report the performance data for this communication session to the NWDAF 227 (see messaging 737). Alternatively, in order to minimize the signaling between the APMF 701 and the NWDAF 227, the APMF 701 may send a single report to the NWDAF 227 containing performance data for multiple communication sessions.

Note that, in order to improve signaling efficiency, the APMF 701 may defer reporting the performance data to the NWDAF 227 to a later time instance, when the APMF 701 has obtained performance data for more communication sessions and provides this data to NWDAF 227 in a batch.

In addition to the performance data, the APMF 701 may also report the UE IP address, the address/ID of the edge application server instance hosting the application, a timestamp denoting when the performance was measured and an identifier for the application. The report may be sent to the NWDAF 227 via the NEF 129.

Figure 8:
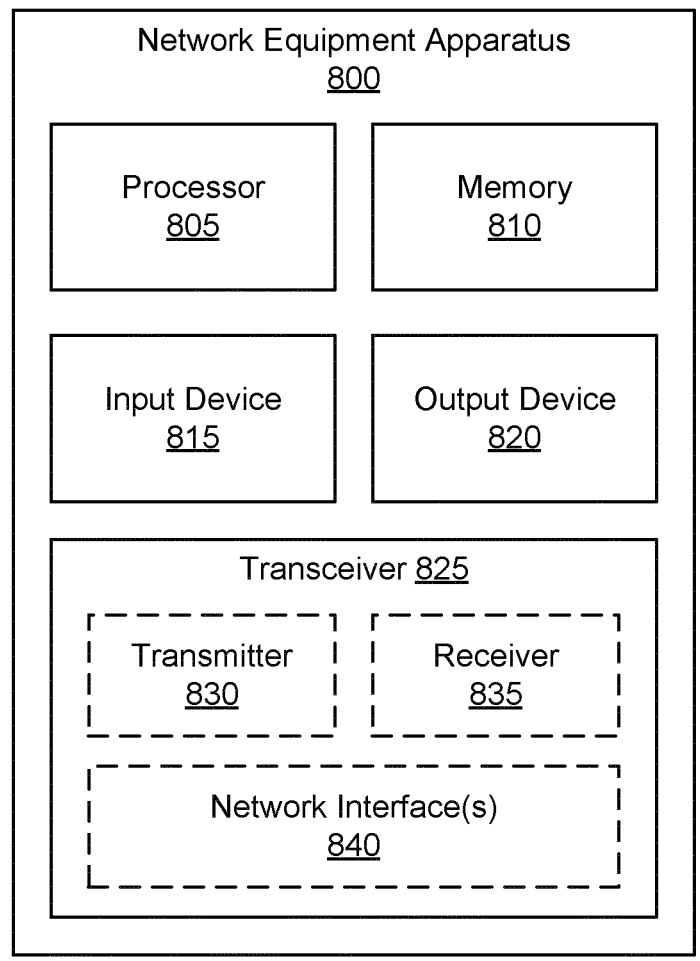
FIG. 8 is a block diagram illustrating one embodiment of a network equipment apparatus for selecting a server application instance.

FIG. 8 depicts one embodiment of a network equipment apparatus 800 that may be used for selecting a server application instance, according to embodiments of the disclosure. In some embodiments, the network equipment apparatus 800 may be one embodiment of a NWDAF 127. In certain embodiments, the network equipment apparatus 800 may be an embodiment of the SDMF 126. In other embodiments, the network equipment apparatus 800 may be one embodiment of an APMF. Furthermore, network equipment apparatus 800 may include a processor 805, a memory 810, an input device 815, an output device 820, a transceiver 825. In some embodiments, the input device 815 and the output device 820 are combined into a single device, such as a touch screen. In certain embodiments, the network equipment apparatus 800 does not include any input device 815 and/or output device 820.

As depicted, the transceiver 825 includes at least one transmitter 830 and at least one receiver 835. Here, the transceiver 825 communicates with one or more remote units 105. Additionally, the transceiver 825 may support at least one network interface 840. In some embodiments, the transceiver 825 supports an interface (e.g., an Nnwdaf interface) for communicating with an NWDAF. In some embodiments, the transceiver 825 supports an interface for communicating with an SDMF. In some embodiments, the transceiver 825 supports an interface for communicating with an APMF. In some embodiments, the transceiver 825 supports an interface (e.g., an Nupf interface) for communicating with an UPF in a mobile core network (e.g., a 5GC).

The processor 805, in one embodiment, may include any known controller capable of executing computer-readable instructions and/or capable of performing logical operations. For example, the processor 805 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 805 executes instructions stored in the memory 810 to perform the methods and routines described herein. The processor 805 is communicatively coupled to the memory 810, the input device 815, the output device 820, and the first transceiver 825.

In various embodiments, the processor 805 controls the network equipment apparatus 800 to implement the above described NWDAF behaviors. In some embodiments, the processor 805 receives a request from a first network function (e.g., SDMF) to provide performance analytics for a first application. Here, the request includes a present location and a requested time. Additionally, the first application comprises a group of application instances. The processor generates performance analytics for the first application by using a first collection of performance data. Here, the performance analytics indicate a best application instance in the group of application instances for the present location and the requested time. Via the network interface, the processor reports the performance analytics to the first network function.

In some embodiments, the processor identifies a first set of APMFs capable of providing performance data for the first application, wherein each APMF provides performance data for at least one application instance in the group of application instances. In such embodiments, the processor may subscribe with each APMF in the first set of APMFs to receive performance data for the first application and build the first collection of performance data for the first application. Here, the first collection comprises all performance data for the first application received from the first set of APMFs, and each performance data is associated with a coverage location and time (e.g. the cell or cells in which the performance data was taken).

In certain embodiments, the processor selects a subset of performance data from a first collection of performance data. Here, each performance data in the subset has a coverage location matching the present location. As used herein, having a coverage location matching the present location means that the present UE location is inside the location wherein the performance data was taken.

In further embodiments, selecting the subset of performance data may include filtering the first collection according to the present location and a particular time. For example, if the request contains the parameter 'location=cell-X' and the request arrives at 13:00, the processor 805 may filter the first collection of performance data to discover the best instance for this location (cell-X) and arround this time (13:00). As such, performance data taken for this location but at 22:00, may be irrelevant. Note that in various embodiments the first request specifies a requested time. Here, the processor filters the first collection according to the requested time.

In some embodiments, the processor 805 reports the performance analytics by providing—for each application instance in the group of application instances—at least one of: performance statistics and performance predictions. In some embodiments, reporting the performance analytics to the first network function includes suggesting an application instance. In some embodiments, the processor 805 reports the performance analytics to the first network function by providing a list of one or more server app instances and the associated performance data.

In various embodiments, the processor 805 controls the network equipment apparatus 800 to implement the above described SDMF behaviors. In some embodiments, the processor 805 receives a first request from a remote unit (i.e., UE) to discover an application server instance for a first application. Here, the remote unit corresponds to a first location. The processor 805 determines that the first request is serviceable by multiple application server instances at the first location and identifies an analytics function (e.g., NWDAF) that provides performance data analytics for the first application. Via the network interface, the processor 805 sends a second request to an NWDAF to retrieve performance data analytics for the first application at the first location and for a requested time. The processor 805 selects an optimal application server instance based on the performance data analytics. Via the network interface, the processor 805 sends a response to the first request, the response including the selected application server instance.

In some embodiments, the processor 805 receives a notification from the NWDAF, the notification including a list of plurality of application server instances for the first application and performance data analytics for the requested time at the first location for each of the application server instances of the list of the plurality of application server instances.

In some embodiments, the processor 805 receives PCC rules from a policy control function in the mobile communication network. In such embodiments, the processor 805 identifies the first application from the first request using the PCC rules. In certain embodiments, the processor 805 determines that the first request is serviceable by multiple application server instances using the PCC rules.

In some embodiments, the processor 805 configures a user plane function to route the first request to the selected application server instance. In some embodiments, the second request identifies the first application and the first location. In some embodiments, the first request comprises a DNS request. In such embodiments, the response to the first request comprises a DNS reply including an IP address of the selected application server instance.

In various embodiments, the processor 805 controls the network equipment apparatus 800 to implement the above described AMPF behaviors. In some embodiments, the processor 805 obtains performance of all (or a selected set) of communication sessions between a client app instance of a first application and a server app instances of the first application. The processor 805 may receive a subscription request from an analytics function. In response to obtaining performance data for a subscribed application, the processor 805

In certain embodiments, the AMPF and server app instance are located in the same EDN. In certain embodiments, the processor 805 configures an application server running the server app instance to report performance data. In one embodiment, the performance data include TCP statistics from the TCP layer. In certain embodiments, the processor 805 queries a location management server and associated performance data with a UE location.

The memory 810, in one embodiment, is a computer readable storage medium. In some embodiments, the memory 810 includes volatile computer storage media. For example, the memory 810 may include a RAM, including dynamic RAM ("DRAM"), synchronous dynamic RAM ("SDRAM"), and/or static RAM ("SRAM"). In some embodiments, the memory 810 includes non-volatile computer storage media. For example, the memory 810 may include a hard disk drive, a flash memory, or any other suitable non-volatile computer storage device. In some embodiments, the memory 810 includes both volatile and non-volatile computer storage media. In some embodiments, the memory 810 stores data relating to selecting a server application instance, for example storing server addresses, UE locations, DNS cache, and the like. In certain embodiments, the memory 810 also stores program code and related data, such as an operating system ("OS") or other controller algorithms operating on the network equipment apparatus 800 and one or more software applications.

The input device 815, in one embodiment, may include any known computer input device including a touch panel, a button, a keyboard, a stylus, a microphone, or the like. In some embodiments, the input device 815 may be integrated with the output device 820, for example, as a touchscreen or similar touch-sensitive display. In some embodiments, the input device 815 includes a touchscreen such that text may be input using a virtual keyboard displayed on the touchscreen and/or by handwriting on the touchscreen. In some embodiments, the input device 815 includes two or more different devices, such as a keyboard and a touch panel.

The output device 820, in one embodiment, may include any known electronically controllable display or display device. The output device 820 may be designed to output visual, audible, and/or haptic signals. In some embodiments, the output device 820 includes an electronic display capable of outputting visual data to a user. For example, the output device 820 may include, but is not limited to, an LCD display, an LED display, an OLED display, a projector, or similar display device capable of outputting images, text, or the like to a user. As another, non-limiting, example, the output device 820 may include a wearable display such as a smart watch, smart glasses, a heads-up display, or the like. Further, the output device 820 may be a component of a smart phone, a personal digital assistant, a television, a table computer, a notebook (laptop) computer, a personal computer, a vehicle dashboard, or the like.

In certain embodiments, the output device 820 includes one or more speakers for producing sound. For example, the output device 820 may produce an audible alert or notification (e.g., a beep or chime). In some embodiments, the output device 820 includes one or more haptic devices for producing vibrations, motion, or other haptic feedback. In some embodiments, all or portions of the output device 820 may be integrated with the input device 815. For example, the input device 815 and output device 820 may form a touchscreen or similar touch-sensitive display. In other embodiments, all or portions of the output device 820 may be located near the input device 815.

As discussed above, the transceiver 825 may communicate with one or more remote units and/or with one or more interworking functions that provide access to one or more PLMNs. The transceiver 825 may also communicate with one or more network functions (e.g., in the mobile core network 120). The transceiver 825 operates under the control of the processor 805 to transmit messages, data, and other signals and also to receive messages, data, and other signals. For example, the processor 805 may selectively activate the transceiver (or portions thereof) at particular times in order to send and receive messages.

The transceiver 825 may include one or more transmitters 830 and one or more receivers 835. In certain embodiments, the one or more transmitters 830 and/or the one or more receivers 835 may share transceiver hardware and/or circuitry. For example, the one or more transmitters 830 and/or the one or more receivers 835 may share antenna(s), antenna tuner(s), amplifier(s), filter(s), oscillator(s), mixer(s), modulator/demodulator(s), power supply, and the like. In one embodiment, the transceiver 825 implements multiple logical transceivers using different communication protocols or protocol stacks, while using common physical hardware.

Figure 9:
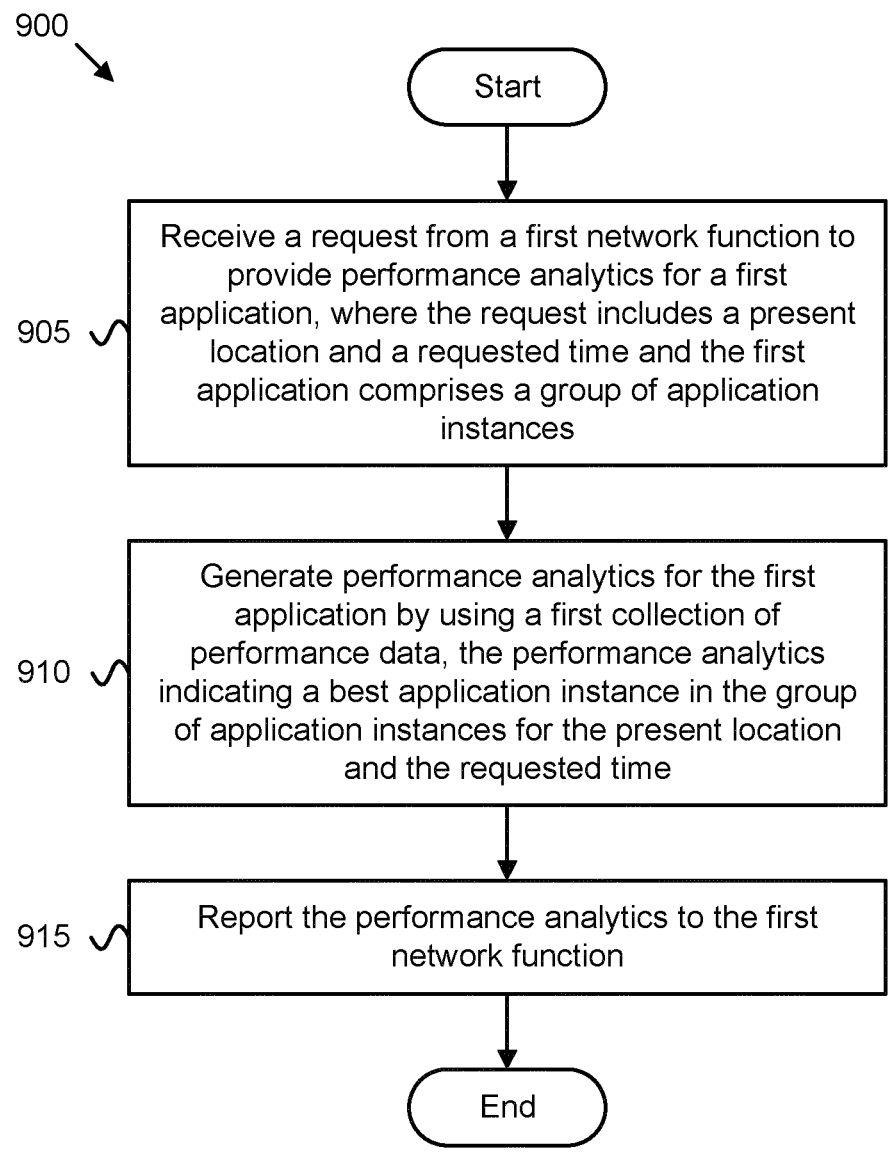
FIG. 9 is a flow chart diagram illustrating one embodiment of a first method for selecting a server application instance.

FIG. 9 depicts one embodiment of a method 900 for selecting a server application instance, according to embodiments of the disclosure. In various embodiments, the method 900 is performed by an analytics function, such as the NWDAF 127, the NWDAF 227, the network equipment apparatus 800, described above. In some embodiments, the method 900 is performed by a processor, such as a microcontroller, a microprocessor, a CPU, a GPU, an auxiliary processing unit, a FPGA, or the like.

The method 900 begins and receives 905 a request from a first network function [i.e., SDMF] to provide performance analytics for a first application. Here, the request includes a present location and a requested time. Additionally, the first application comprises a group of application instances. The method 900 includes generating 910 performance analytics for the first application by using a first collection of performance data. Here, the performance analytics indicate a best application instance in the group of application instances for the present location and the requested time. The method 900 includes reporting 915 the performance analytics to the first network function. The method 900 ends.

Figure 10:
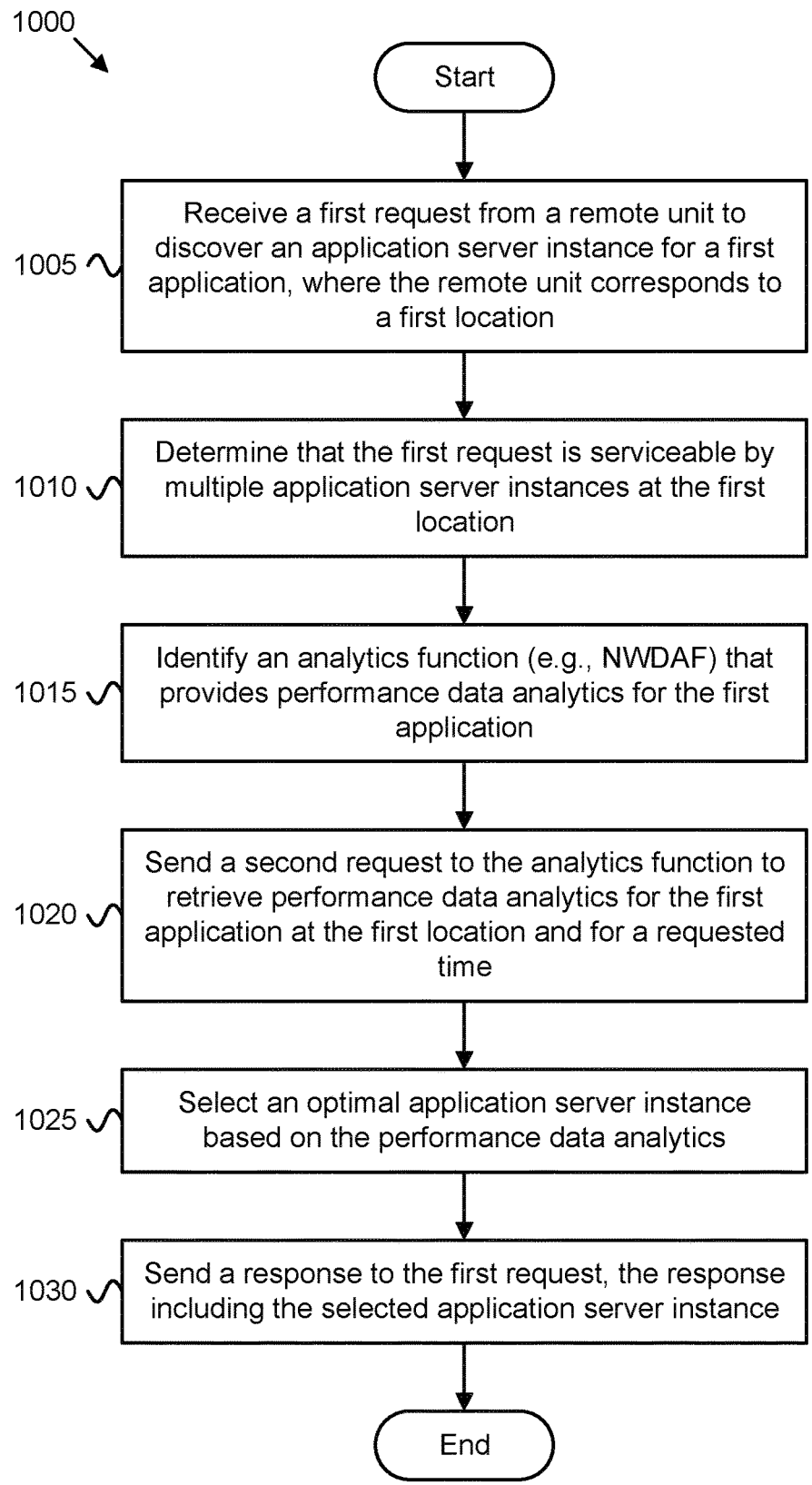
FIG. 10 is a flow chart diagram illustrating one embodiment of a second method for selecting a server application instance.

FIG. 10 depicts one embodiment of a method 1000 for selecting a server application instance, according to embodiments of the disclosure. In various embodiments, the method 1000 is performed by a network function, such as the SDMF 126, the SDMF 225, the network equipment apparatus 800, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first request from a remote unit to discover an application server instance for a first application. Here, the remote unit corresponds to a first location. The method 1000 includes determining 1010 that the first request is serviceable by multiple application server instances at the first location. The method 1000 includes identifying 1015 a NWDAF that provides performance data analytics for the first application.

The method 1000 includes sending 1020 a second request to an NWDAF to retrieve performance data analytics for the first application at the first location and for a requested time. The method 1000 includes selecting 1025 an optimal application server instance based on the performance data analytics. The method 1000 includes sending 1030 a response to the first request, the response including the selected application server instance. The method 1000 ends.

Disclosed herein is a first apparatus for selecting a server application instance, according to embodiments of the disclosure. The first apparatus may be implemented by an analytics function, such as the NWDAF 127, the NWDAF 227, the network equipment apparatus 800, described above. The first apparatus includes a network interface that communicates with a plurality of network functions (e.g., APMFs, SDMF, etc.) in a mobile communication network. The first apparatus includes a processor that receives a request from a first network function (e.g., SDMF) to provide performance analytics for a first application. Here, the request includes a present location and a requested time. Additionally, the first application comprises a group of application instances. The processor generates performance analytics for the first application by using a first collection of performance data. Here, the performance analytics indicate a best application instance in the group of application instances for the present location and the requested time. Via the network interface, the processor reports the performance analytics to the first network function.

In some embodiments, the processor identifies a first set of APMFs capable of providing performance data for the first application, wherein each APMF provides performance data for at least one application instance in the group of application instances. In such embodiments, the processor may subscribe with each APMF in the first set of APMFs to receive performance data for the first application and build the first collection of performance data for the first application. Here, the first collection comprises all performance data for the first application received from the first set of APMFs, and each performance data is associated with a coverage location and time (e.g. the cell or cells in which the performance data was taken).

In certain embodiments, the processor selects a subset of performance data from a first collection of performance data. Here, each performance data in the subset has a coverage location matching the present location. Here, matches means "the present UE location is inside the location wherein the performance data was taken." In further embodiments, selecting the subset of performance data may include filtering the first collection according to the present location and the requested time.

In some embodiments, reporting the performance analytics includes providing—for each application instance in the group of application instances—at least one of: performance statistics and performance predictions. In some embodiments, reporting the performance analytics to the first network function includes suggesting an application instance. In some embodiments, reporting the performance analytics to the first network function includes providing a list of one or more server app instances and the associated performance data.

Disclosed herein is a first method for selecting a server application instance, according to embodiments of the disclosure. The first method may be performed by an analytics function, such as the NWDAF 127, the NWDAF 227, the network equipment apparatus 800, described above. The first method includes receiving a request from a first network function (e.g., SDMF) to provide performance analytics for a first application. Here, the request includes a present location and a requested time. Additionally, the first application comprises a group of application instances. The method includes generating performance analytics for the first application by using a first collection of performance data. Here, the performance analytics indicate a best application instance in the group of application instances for the present location and the requested time. The method includes reporting the performance analytics to the first network function.

In some embodiments, the first method includes identifying a first set of APMFs capable of providing performance data for the first application. Here, each APMF provides performance data for at least one application instance in the group of application instances. In such embodiments, the first method may include subscribing with each APMF in the first set of APMFs to receive performance data for the first application and build the first collection of performance data for the first application. Here, the first collection comprises all performance data for the first application received from the first set of APMFs, and each performance data is associated with a coverage location and time (e.g. the cell or cells in which the performance data was taken).

In certain embodiments, the first method includes selecting a subset of performance data from a first collection of performance data, wherein each performance data in the subset has a coverage location matching the present location. Here, matches means "the present UE location is inside the location wherein the performance data was taken." In further embodiments, selecting the subset of performance data may include filtering the first collection according to the present location and the requested time.

In some embodiments, reporting the performance analytics includes providing—for each application instance in the group of application instances—at least one of: performance statistics and performance predictions. In some embodiments, reporting the performance analytics to the first network function includes suggesting an application instance. In some embodiments, reporting the performance analytics to the first network function includes providing a list of one or more server app instances and the associated performance data.

Disclosed herein is a second apparatus for selecting a server application instance, according to embodiments of the disclosure. The second apparatus may be implemented by a network function, such as the SDMF 126, the SDMF 225, the network equipment apparatus 800, described above. The second apparatus includes a network interface that communicates with a plurality of network functions (e.g., NWDAF, UPF, etc.) in a mobile communication network. The second apparatus includes a processor that receives a first request from a remote unit to discover an application server instance for a first application. Here, the remote unit corresponds to a first location. The processor determines that the first request is serviceable by multiple application server instances at the first location and identifies an analytics function (e.g., NWDAF) that provides performance data analytics for the first application. Via the network interface, the processor sends a second request to an NWDAF to retrieve performance data analytics for the first application at the first location and for a requested time. The processor selects an optimal application server instance based on the performance data analytics. Via the network interface, the processor sends a response to the first request, the response including the selected application server instance.

In some embodiments, the processor receives a notification from the NWDAF, the notification including a list of plurality of application server instances for the first application and performance data analytics for the requested time at the first location for each of the application server instances of the list of the plurality of application server instances.

In some embodiments, the processor receives PCC rules from a policy control function in the mobile communication network. In such embodiments, the processor identifies the first application from the first request using the PCC rules. In certain embodiments, the processor determines that the first request is serviceable by multiple application server instances using the PCC rules.

In some embodiments, the processor configures a user plane function to route the first request to the selected application server instance. In some embodiments, the second request identifies the first application and the first location. In some embodiments, the first request comprises a DNS request. In such embodiments, the response to the first request comprises a DNS reply including an IP address of the selected application server instance.

Disclosed herein is a second method for selecting a server application instance, according to embodiments of the disclosure. The second method may be implemented by a network function, such as the SDMF 126, the SDMF 225, the network equipment apparatus 800, described above. The second method includes receiving a first request from a remote unit to discover an application server instance for a first application. Here, the remote unit corresponds to a first location. The second method includes determining that the first request is serviceable by multiple application server instances at the first location. The second method includes identifying an analytics function (e.g., NWDAF) that provides performance data analytics for the first application. The second method includes sending a second request to the analytics function to retrieve performance data analytics for the first application at the first location and for a requested time. The second method includes selecting an optimal application server instance based on the performance data analytics. The second method includes sending a response to the first request, the response including the selected application server instance.

In some embodiments, the second method includes receiving a notification from the NWDAF, the notification including a list of plurality of application server instances for the first application and performance data analytics for the requested time at the first location for each of the application server instances of the list of the plurality of application server instances.

In some embodiments, the second method includes receiving PCC rules from a policy control function in the mobile communication network. In such embodiments, the first application is identified from the first request using the PCC rules. In certain embodiments, the first request is determined to be serviceable by multiple application server instances using the PCC rules.

In some embodiments, the second method includes configuring a user plane function to route the first request to the selected application server instance. In some embodiments, the second request identifies the first application and the first location. In some embodiments, the first request comprises a DNS request. In such embodiments, the response to the first request comprises a DNS reply including an IP address of the selected application server instance.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a network interface that communicates with a plurality of network functions in a mobile communication network; and
a processor configured to cause the apparatus to:
receive a request from a first network function to provide performance analytics for a first application, wherein the request includes a present location and a requested time, wherein the first application comprises a group of application instances;
generate the performance analytics for the first application by using a first collection of performance data, wherein the performance analytics indicate a best application instance in the group of application instances for the present location and the requested time; and
report the performance analytics to the first network function.

2. The apparatus of claim 1, wherein the processor is further configured to cause the apparatus to:
idenitfy a first set of Application Performance Measurement Functions ("APMFs") capable of providing performance data for the first application, wherein each APMF provides performance data for at least one application instance in the group of application instances;
subscribe with each APMF in the first set of APMFs to receive performance data for the first application; and
build the first collection of performance data for the first application, wherein the first collection comprises all performance data for the first application received from the first set of APMFs, and wherein each performance data is associated with a coverage location and time.

3. The apparatus of claim 2, wherein the processor is further configured to cause the apparatus to filter the first collection according to the present location and the requested time.

4. The apparatus of claim 1, wherein to report the performance analytics, the processor is configured to cause the apparatus to provide, for each application instance in the group of application instances, at least one of: performance statistics or performance predictions.

5. The apparatus of claim 1, wherein to report the performance analytics to the first network function, the processor is configured to cause the apparatus to suggest an application instance.

6. The apparatus of claim 1, wherein to report the performance analytics to the first network function, the processor is configured to cause the apparatus to provide a list of one or more server app instances and the associated performance data.

7. A method comprising:
receiving a request from a first network function to provide performance analytics for a first application, wherein the request includes a present location and a requested time, wherein the first application comprises a group of application instances;
generating the performance analytics for the first application by using a first collection of performance data, wherein the performance analytics indicate a best application instance in the group of application instances for the present location and the requested time; and
reporting the performance analytics to the first network function.

8. The method of claim 7, wherein reporting the performance analytics comprises providing, for each application instance in the group of application instances, at least one of: performance statistics or performance predictions.

9. The method of claim 7, wherein reporting the performance analytics to the first network function includes suggesting an application instance.

10. The method of claim 7, wherein reporting the performance analytics to the first network function includes providing a list of one or more server app instances and the associated performance data.

11. An apparatus comprising:
a network interface that communicates with a plurality of network functions in a mobile communication network; and
a processor configured to cause the apparatus to:
receive a first request from a remote unit to discover an application server instance for a first application, the remote unit corresponding to a first location;
determine that the first request is serviceable by multiple application server instances at the first location;
identify a network data analytics function ("NWDAF") that provides performance data analytics for the first application;
send a second request to an NWDAF to retrieve the performance data analytics for the first application at the first location and for a requested time;
select an application server instance based on the performance data analytics; and
send a response to the first request, the response including the selected application server instance.

12. The apparatus of claim 11, wherein the processor is further configured to cause the apparatus to receive a notification from the NWDAF, the notification including a list of plurality of application server instances for the first application and respective performance data analytics for the requested time at the first location for each of the application server instances of the list of the plurality of application server instances.

13. The apparatus of claim 11, wherein the processor is further configured to cause the apparatus to receive Policy and Charging Control ("PCC") rules from a policy control function ("PCF") in the mobile communication network, wherein the processor is further configured to cause the apparatus to identify the first application from the first request using the PCC rules.

14. The apparatus of claim 11, wherein the processor is further configured to cause the apparatus to receive Policy and Charging Control ("PCC") rules from a policy control function ("PCF") in the mobile communication network, wherein the first request is determined to be serviceable by multiple application server instances using the PCC rules.

15. The apparatus of claim 11, wherein the processor is further configured to cause the apparatus to configure a user plane function ("UPF") to route the first request to the selected application server instance.

16. The apparatus of claim 11, wherein the second request identifies the first application and the first location.

17. The apparatus of claim 11, wherein the first request comprises a DNS request and wherein the response to the first request comprises a Domain Name System ("DNS") reply including an Internet Protocol ("IP") address of the selected application server instance.

* * * * *